July 10, 1923.
A. B. BEITMAN
WEATHER STRIP
Filed July 27, 1920
1,461,079
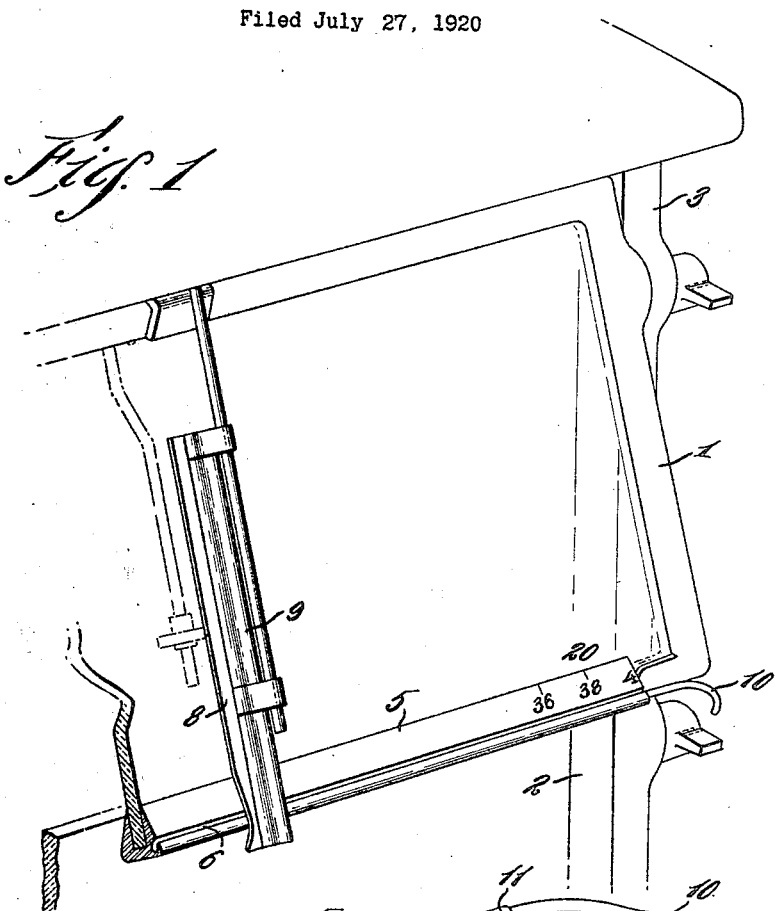
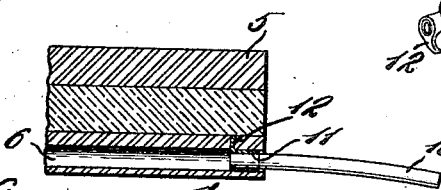
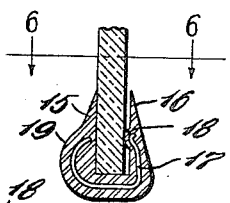
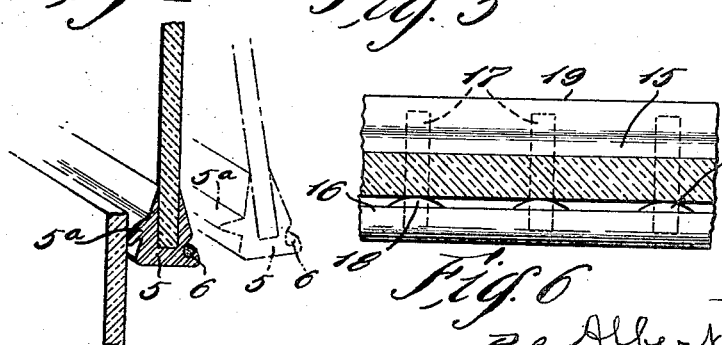
Inventor,
Albert B. Beitman
By Hull, Smith, Brock & West Attys.

Patented July 10, 1923.

1,461,079

UNITED STATES PATENT OFFICE.

ALBERT B. BEITMAN, OF CLEVELAND, OHIO.

WEATHER STRIP.

Application filed July 27, 1920. Serial No. 399,357.

*To all whom it may concern:*

Be it known that I, ALBERT B. BEITMAN, a citizen of the United States, residing at Cleveland, in the county of Cuyahoga and State of Ohio, have invented a certain new and useful Improvement in Weather Strips, of which the following is a full, clear, and exact description, reference being had to the accompanying drawings.

This invention relates to a weather strip for automobile windshields of the ventilating type.

With windshields of this class, when it is raining and the upper sash is adjusted with its lower edge beyond the upper edge of the lower sash for ventilating purposes, the rain water which drips from the upper sash is picked up by the current of air that enters between the edges of the sashes and is hurled into the automobile. This difficulty becomes more serious when a windshield cleaner is used for upon each operation of the cleaner a very considerable amount of water is thrown off.

Now, it is the purpose of my invention to provide an inexpensive weather strip, constructed preferably of pliable material such as rubber, which can be quickly and very easily applied to the windshield without the use of tools and held thereon by friction; which incorporates a drain trough for collecting and delivering beyond the sides of the windshield the rain water which drips from the upper sash; and which is of such a character as not to interfere with the action of a windshield cleaner.

A further object comprehended by my invention is the production of a weather strip of a length to fit windshields of the maximum width and provided with indications which designate where it may be cut to fit the standard sizes of lesser widths, thereby to greatly facilitate applying the device and relieving the dealer of having to stock such a variety of sizes.

It is my present intention to make the strips of a length to fit between the side members of the windshield frame; and a further object is to provide the strip with yielding extensions, preferably attachable so that they may be incorporated after the strip is cut to fit the windshield, which serves to conduct the water beyond the sides of the windshield and which will yield if struck against the supporting posts or brackets of the windshield when the sash which carries the strip is swung past the same.

A still further object is to provide a weather strip that is applicable to windshields of the two types wherein, in one instance, the upper sash overlaps the lower sash, and in the other the upper sash is spaced with its lower edge sufficiently above the upper edge of the lower sash to swing past it in both directions, and which strip, in either instance, will serve to effectually close the gap between the sashes.

Various modifications of my invention are illustrated in the drawing accompanying and forming a part hereof. In the drawing, Fig. 1 is a fragmentary perspective view of a windshield equipped with one form of my invention; Fig. 2 is a perspective view of one of the tubular extensions for conveying the water beyond the sides of the windshield; Fig. 3 is a horizontal sectional view through the end of the strip showing the manner of attaching the tubular extension; Fig. 4 is a sectional detail showing a modification of the strap that is especially adapted for windshields of the type wherein the upper sash overlaps the lower; Fig. 5 is a similar view of a further modification of the strip; and Fig. 6 is a section on the line 6—6 of Fig. 5.

The upper and lower sashes 1 and 2, respectively, of the windshield are pivotally supported in the usual manner from the posts or brackets, one of which is indicated at 3, and to the lower edge of the upper sash is applied my improved weather strip 5.

The strip is preferably made of rubber or other pliable material in channel form, and is adapted to be frictionally engaged over the lower edge of the windshield pane. A water collecting groove or trough 6 extends from end to end along the outer side of the strip. Attention is called to the fact that the outer flange of the strip is comparatively thin and that it merges very gradually into the surface of the pane. Also, that there is no protuberance occasioned by the presence of the groove or trough 6. Consequently, the strip does not interfere with the action of the wiper or squeegee 8 of a windshield cleaner 9 as the same is swung across the surface of the pane, although the squeegee may extend a material distance beyond the lower edge of the plane.

The user, at his option, may equip the strip with the tubular extensions 10, with some windshield constructions it might be found that the water discharged from the ends of the grooves 6 would blow in under or about the end of the sash, and by employing the tubular extensions 10 this water would be conveyed beyond the sides of the windshield and discharged alongside the automobile. The extensions, being flexible, would not interfere with the lower edge of the sash being swung in both directions beyond the posts or brackets 3. The tubular extensions 10 are preferably constructed of rubber tubes of suitable length and a metal ferrule 11 is connected to one end of the tube and has a prong 12 which may be engaged within one wall of the groove 6, as indicated in Fig. 3, to hold the tube in place.

Where the strip is intended for use expressly with windshields wherein the upper sash overlaps the lower sash, the rear flange of the strip may be provided with a flexible rib or fin 5ª, as indicated in Fig. 4, for engagement with the lower sash when the sashes are in closed condition. This forms an effectual closure for the space between the edges of the sashes.

In Figs. 5 and 6 is shown a modification of the strip, designated 15, wherein the outer flange 16 is spaced a slight distance from the front surface of the pane. A water collecting space of considerable capacity is thus provided by a very slight spacing of the flange from the pane; and furthermore the front surface of the strip is left intact. Inasmuch as the upper edge of the outer flange is flexible because of the fact that the strip is constructed of pliable material, and is spaced such a slight distance from the pane, the strip will offer no obstruction to the windshield cleaner. In the present modification, although this feature is applicable to the various forms, I have shown spring elements or clips 17 incorporated in the strip and spaced suitable distances apart throughout its length. These clips extend through the web of the channel and upwardly within each flange, and projections 18 are formed on the inner surface of the outer flange 16 adjacent the ends of the clips. These projections serve to space the outer flange from the adjacent surface of the pane as above described. An enlargement 19 is formed along the inner side of the strip and serves to close the space between the sashes when the strip is used on windshields of the type wherein the upper sash overlaps the lower.

The strip, in any of its forms, may be made of a length to fit the maximum width windshields and it may bear indications, designated 20 in Fig. 1, where it may be cut to fit windshields of the lesser standard widths.

Having thus described my invention, what I claim is:—

1. A weather strip for windshields comprising a channel member designed for attachment to the edge of the windshield pane and having a water collecting groove within the plane of the front surface of its outer flange.

2. A weather strip for windshields comprising a channel member designed for attachment to the edge of the windshield pane and having a water collecting groove within the plane of the front surface of its outer flange, a flexible tube adapted to be fitted within the end of said groove, and means for attaching the tube to the aforesaid member.

3. A weather strip for windshields comprising a member designed for attachment to the edge of the windshield pane and having a water collecting groove, and a flexible tube having a ferrule at one end adapted to be fitted within the end of the groove, the ferrule being provided with a prong for engagement within the wall of the groove.

4. A weather strip for automobile windshields of the character set forth comprising a channel member of pliable material designed for attachment to the lower edge of upper pane of the windshield and having a flexible rib extending along its inner side for engagement with the edge portion of the lower pane, the strip having a water collecting groove within the plane of its front surface.

5. A weather strip for windshields comprising a channel member designed for attachment to the edge of the windshield pane, and a trough incorporated in the strip, the open side whereof is substantially within the plane of the front of said member.

6. A weather strip for windshields comprising a channel member designed for attachment to the edge of the windshield pane, a trough incorporated in the strip, the open side whereof is substantially within the plane of the front of said member, and a pliable rib extending along the rear side of the member.

In testimony whereof, I hereunto affix my signature.

ALBERT B. BEITMAN.